US009296365B2

(12) United States Patent
Jiao et al.

(10) Patent No.: US 9,296,365 B2
(45) Date of Patent: Mar. 29, 2016

(54) METHOD AND APPARATUS FOR REMOVING FOREIGN MATERIAL FROM AN UPWARDLY ORIENTED SURFACE OF A BODY-IN-WHITE

(75) Inventors: Qian Jiao, Woodstock (CA); Ryan Westbrook, Kitchener (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 710 days.

(21) Appl. No.: 13/442,041

(22) Filed: Apr. 9, 2012

(65) Prior Publication Data

US 2013/0263891 A1     Oct. 10, 2013

(51) Int. Cl.
 A47L 5/38    (2006.01)
 A47L 15/00   (2006.01)
 B60S 3/06    (2006.01)
 B08B 1/04    (2006.01)
 B08B 5/04    (2006.01)

(52) U.S. Cl.
 CPC . B60S 3/066 (2013.01); B08B 1/04 (2013.01); B08B 5/04 (2013.01); B08B 5/043 (2013.01); B60S 3/06 (2013.01)

(58) Field of Classification Search
 CPC ............ B60C 3/06; B60C 3/066; B08B 1/02; B08B 1/04; B08B 5/04; B08B 5/043; A47L 7/0076
 USPC .............................. 15/311, 97.3, 306.1–312.1
 See application file for complete search history.

(56) References Cited

U.S. PATENT DOCUMENTS

| | | | |
|---|---|---|---|
| 1,942,653 A * | 1/1934 | Kiggins | 15/53.3 |
| 1,962,167 A * | 6/1934 | Zimmer | 15/53.3 |
| 3,187,359 A * | 6/1965 | Takeuchi | 15/53.2 |
| 3,705,435 A | 12/1972 | Von Kulmer | |
| 3,909,865 A | 10/1975 | Scheuermann | |
| 4,250,591 A * | 2/1981 | Mello | B60S 3/002 15/309.2 |
| 4,689,749 A * | 8/1987 | Glogowski | B60S 3/06 15/316.1 |
| 4,972,544 A | 11/1990 | Reid | |
| 5,405,450 A | 4/1995 | Mifsud | |
| 5,454,136 A | 10/1995 | Gougoulas | |
| 5,524,329 A * | 6/1996 | Schmalzel | 15/312.1 |
| 5,713,092 A * | 2/1998 | Belanger et al. | 15/53.2 |
| 5,732,723 A | 3/1998 | Uesaka et al. | |
| 5,989,356 A | 11/1999 | Candeletti | |
| 6,453,500 B1 | 9/2002 | Schmitt | |
| 6,654,978 B2 | 12/2003 | Bouchard | |
| 6,745,497 B2 | 6/2004 | McElroy | |
| 7,017,226 B2 * | 3/2006 | Ikeda | B08B 1/04 15/308 |
| 7,318,245 B2 | 1/2008 | Ballard et al. | |
| 7,347,213 B2 | 3/2008 | Messing | |
| 7,617,561 B2 | 11/2009 | Couture | |

* cited by examiner

*Primary Examiner* — Bryan R Muller
(74) *Attorney, Agent, or Firm* — Christopher G. Darrow; Darrow Mustafa PC

(57) ABSTRACT

A method and apparatus for removing foreign material from an upwardly oriented surface of a body-in-white are provided. The apparatus includes a vacuum member mounted to a frame for removing foreign material from the associated upwardly oriented surface and a soft-material brush mounted to the frame rearward of the vacuum member as defined by the direction of forward travel of the body-in-white. The apparatus may also include a vertical adjustment device(s) configured to adjust and maintain vertical distance between the apparatus relative to the associated vehicle. Also disclosed herein is a method for removing foreign material from an upwardly oriented surface of a body-in-white that comprises bringing the apparatus defined herein in proximate contact with at least one surface of a body-in-white as it progresses down a vehicle assembly line.

14 Claims, 4 Drawing Sheets

METHOD AND APPARATUS FOR REMOVING FOREIGN MATERIAL FROM AN UPWARDLY ORIENTED SURFACE OF A BODY-IN-WHITE

BACKGROUND

The present invention generally relates to devices for surface cleaning and preparation processes and apparatuses associated with vehicular assembly processes.

In order to attain an effective and aesthetically pleasing finished vehicle surface that also protects against rust and corrosion, the underlying substrate must be effectively free of foreign material including, but not limited to, foreign dust particles, dirt particles, lint, oils and the like during various phases of surface treatment and assembly. To achieve a suitable durable substrate surface to which various paints and finishes can adhere, the body-in-white is coated with various corrosion inhibiting and/or adhesion promoting finishes. A body-in-white or BIW refers to a stage in automotive design or manufacture prior to painting in which the sheet metal components of the car have been welded together but moving parts have not been added. The body-in-white can be subjected to various operations and processes associated with the ultimate vehicle assembly. Various types of foreign material can adhere to the body-in-white as a result of these operations.

In order to provide an effective surface finish, the body-in-white is provided with a suitable adhesion promoting coating or surface treatment prior to painting and/or finish coating. Such materials include, but are not limited to, processes and materials collectively referred to as e-coating. In order for e-coating processes to be effective, the substrate surface must be free from foreign material contamination to extremely close tolerances. Various processes and surface cleaning methods have been proposed to remove most, if not all, foreign material prior to e-coating procedures. Various automated mechanical and vacuum surface cleaning processes have been proposed and attempted. However, the various attempts have met with varying degrees of limited success either in the effectiveness in the removal of foreign material and/or in the risk of damaging or scarring surface of the body-in-white during surface cleaning operations.

Certain regions of the body-in-white pose greater challenges for achieving surfaces that are sufficiently free of foreign material for e coating and/or other surface finish processes. These include, but are not limited to, upwardly oriented surfaces such as the roof region of the body-in-white. It would be desirable to provide an efficient and effective automated method and apparatus that can remove foreign material and surface oil and dirt from a body-in-white without damaging the integrity of the body-in-white surface. More particularly, it is desirable to provide a method and apparatus for removing foreign material such as dirt and oil from the roof surface of a body-in-white.

SUMMARY

Disclosed herein is an apparatus and method for removing foreign material from an upwardly oriented surface of a body-in-white. The apparatus includes a vacuum member mounted to a boom frame and a soft-material brush mounted to the frame rearward of the vacuum member as defined by the direction of forward travel of the body-in-white. Collectively, the vacuum member and soft-material brush are configured and positioned to remove foreign material from the associated upwardly oriented surface. The apparatus may also contain vertical adjustment device(s) configured to adjust and maintain vertical distance between the apparatus relative to the associated vehicle. Also disclosed herein is a method for removing foreign material from an upwardly oriented surface of a body-in-white that comprises bringing the apparatus defined herein into proximate contact with at least one surface of a body-in-white as it progresses down a vehicle assembly line.

DESCRIPTION OF THE DRAWINGS

In order to facilitate the present disclosure, reference is made to the following illustrative drawing figures in which like reference numerals are employed where appropriate throughout the various views.

DETAILED DESCRIPTION

Figure 1:
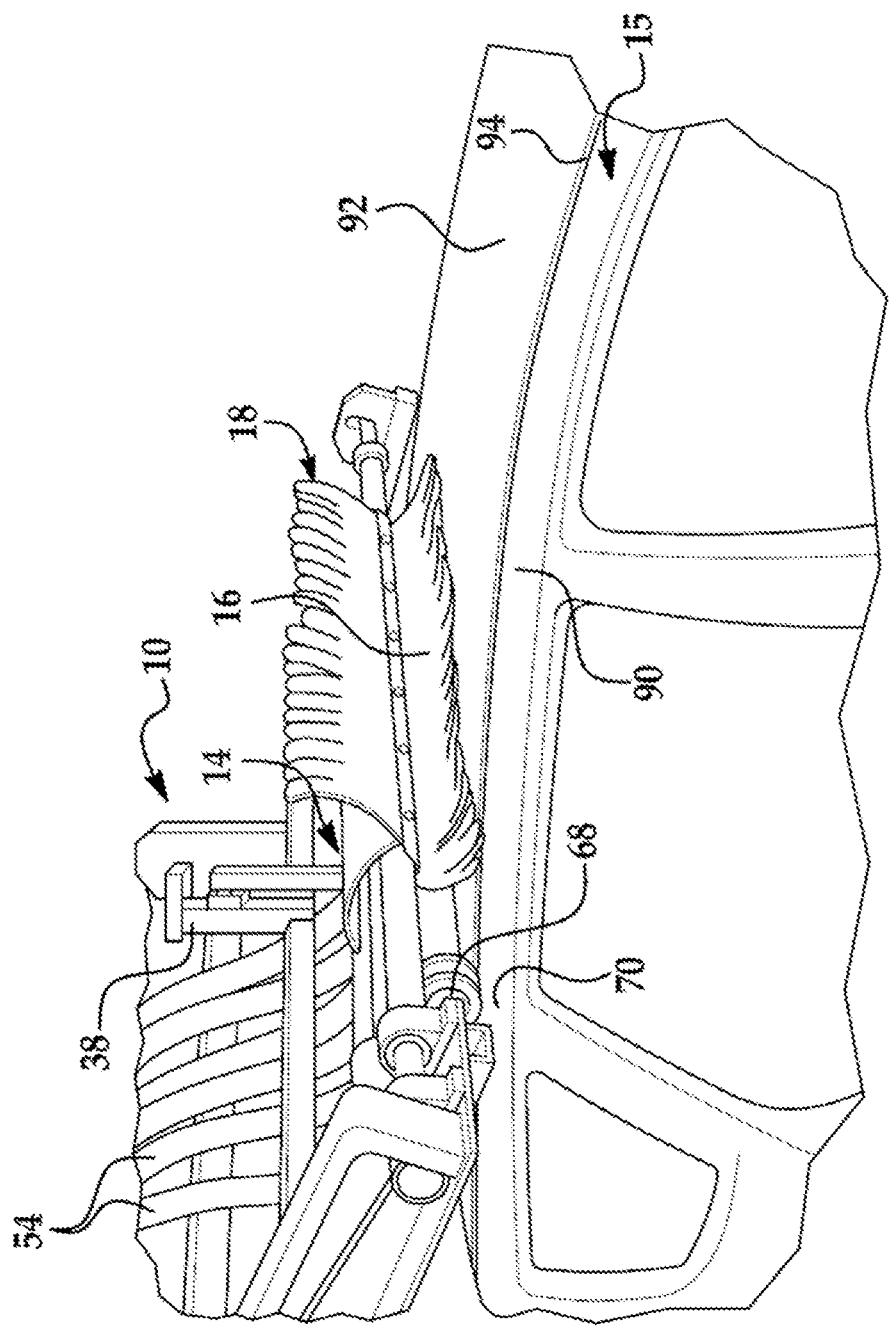
FIG. 1 is a perspective view of the apparatus for removing foreign material from an upwardly oriented surface of a body-in-white according to an embodiment as disclosed herein.

The present disclosure relates to a system for removing foreign material from an upwardly oriented surface of a body-in-white. The apparatus includes a vacuum member operatively mounted for removing foreign material from the associated upwardly oriented surface and a soft-material brush. The vacuum member and soft-material brush are mounted to a frame with the soft member brush rearward of the vacuum member as defined by the direction of forward travel of the body-in-white. The apparatus may also contain vertical adjustment device(s) configured to adjust and maintain vertical distance between the apparatus relative to the associated vehicle. Also disclosed herein is a method for removing foreign material from an upwardly oriented surface of a body-in-white that comprises bringing the apparatus defined herein into proximate contact with at least one surface of a body-in-white as it progresses down a vehicle assembly line.

The apparatus 10 as disclosed herein is composed of a boom frame 12 having a vacuum member 14 and brush member 16 operatively mounted on the boom frame 12. The vacuum member 14 and brush member 16 collectively form a vacuum brush assembly 18. The vacuum brush assembly 18 is configured and oriented to remove foreign material from an upwardly oriented surface of a body-in-white 15. As used herein, the term body-in-white or BIW refers to a stage in automotive design or automotive manufacturing prior to painting in which the associated sheet metal components have been welded together but moving parts such as doors, hoods and deck lids as well as fenders together with the motor, chassis sub-assemblies or trim have not been added. In certain specific embodiments, the apparatus 10 is oriented and configured to remove foreign material specifically from the roof region 92 of the associated body-in-white (BIW) 15.

The boom frame 12 can be mounted on suitable uprights 20, 20' which can be suitably positioned and configured to support the boom frame 12 and permit conveyance of the associated body-in-white 15 therethrough. The boom frame 12 together with the associated vacuum member 14 and brush member 16 are moveably connected to the uprights 20, 20'. The boom frame 12 configuration and frame connection means are configured to permit and facilitate the movement of the vacuum member 14 and brush member 16 to follow the contour of the upwardly oriented surface such as the roof 92 of the associated body-in-white 15.

In the embodiment depicted, the boom frame 12 is placed in pivotally cantilevered relationship to uprights 20, 20'. The vacuum-brush assembly 18 is positioned at an outwardly extended location on the boom frame 12. The boom frame 12 can include suitable means for moving the boom frame 12 and associated vacuum-brush assembly 18 relative to the contour of the associated BIW.

Figure 4:
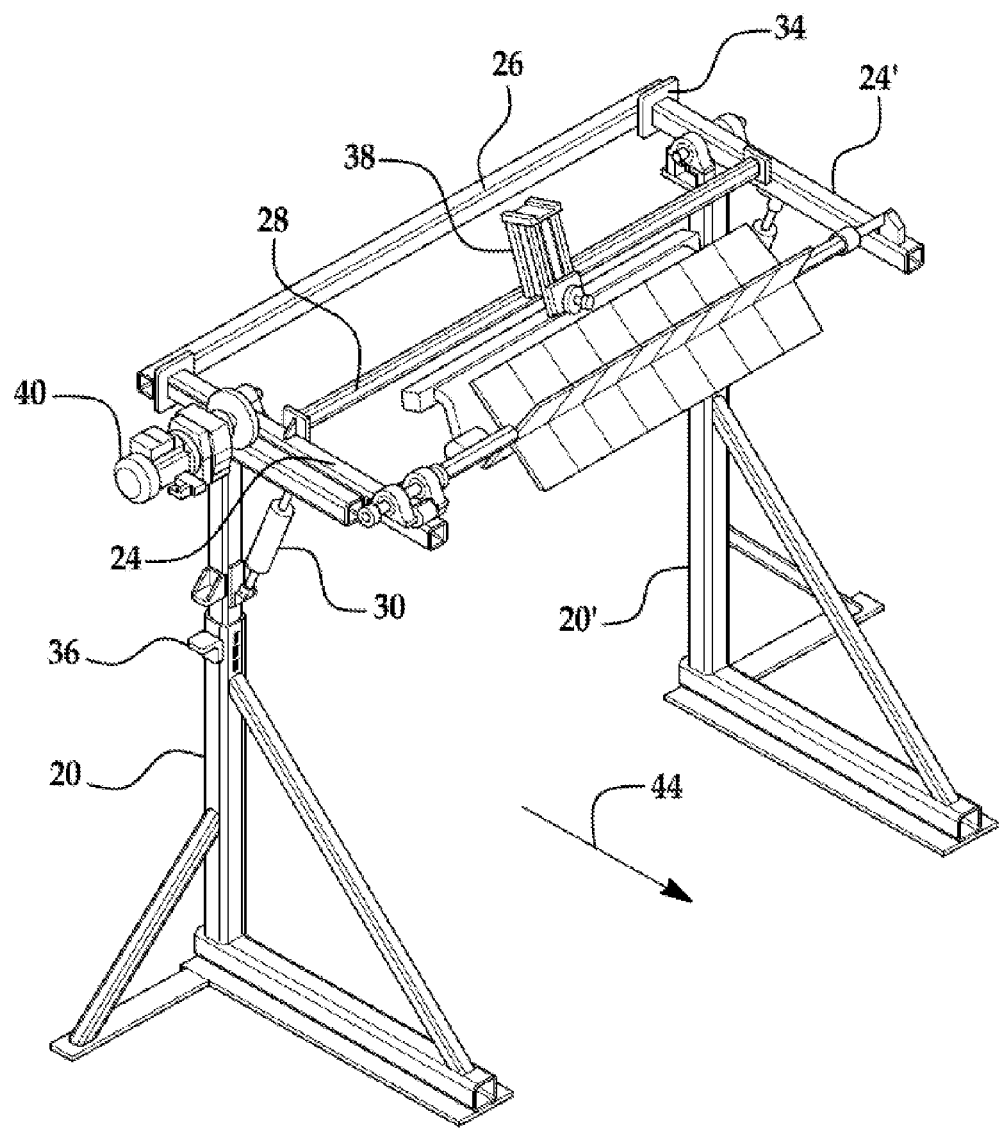
FIG. 4 is a perspective view of an embodiment of the apparatus as disclosed herein with the vacuum hoses and frame removed for clarity.

As illustrated in FIG. 4, the boom frame 12 is a rectilinear member having opposed side arms 24, 24' each having respective first and second ends. The opposed side arms 24, 24' are pivotally connected to respective uprights 20, 20'. The vacuum-brush assembly 18 is mounted between the first ends of the opposed side arms 24, 24' in any suitable manner. In the embodiment depicted in the drawing figures, the vacuum brush assembly is configured to compose one elongated side of the boom frame 12. Lateral member 26 is connected between the second ends of the respective side arms 24, 24' at a position opposed to the vacuum-brush assembly 18. The boom frame 12 can also include a central lateral member 28 projecting perpendicularly between and mounted to side arms 24, 24' at a location medial to the vacuum-brush assembly 18 and the lateral member 26.

The boom frame 12 is pivotally mounted to uprights 20, 20' or other suitable mounting means at a location positioned between the central lateral member 28 and the lateral member 26. Apparatus 10 can include means for balancing the boom frame 12 relative to the uprights 20, 20' and maintaining the associated vacuum-brush assembly 18 in an operative position relative to the upwardly oriented surface of the body-in-white 15. The balancing means can include, but need not be limited to, suitable stabilizers, counterweights, float cylinders and the like. In the embodiment depicted in FIG. 4, the apparatus 10 can include suitable jack screws or tilt cylinder(s) 30 operatively connected to the associated upright member(s) 20, 20' and engaging the boom frame 12 to permit adjustment of the outwardly extending cantilevered portion of the boom frame 12. In the embodiment depicted in the various drawing figures, the boom frame 12 can also include suitable counterweights located in opposed relationship to vacuum-brush assembly 18. Where desired or required, a counterweight such as counterweight 34 can be attached to or incorporated in lateral member 26 or on the side arms(s) 24, 24' proximate to the lateral member 26.

Upright members 20, 20' can be configured to provide a stable support for the associated boom frame 12. Thus the uprights 20, 20' can include suitable braces, stabilization legs and supports in order to achieve such stability. The uprights 20, 20' can also include suitable means to adjust the height of the apparatus 10 to a suitable operational level. Non-limiting examples of suitable height adjustment means include suitable telescoping connecters 36 and the like.

The apparatus 10 can also include means for stabilizing pivotal movement of the lift boom 12. Non-limiting examples of suitable stabilizers can include suitable float cylinders and the like such as float cylinder 38 which can be connected to the boom frame 12 at any suitable location. In the embodiment depicted in the drawing figures, the float cylinder 38 is connected to the central lateral member 28. The float cylinder 38 can be configured to mitigate or attenuate upward and/or downward of the boom frame 12.

Figure 2:
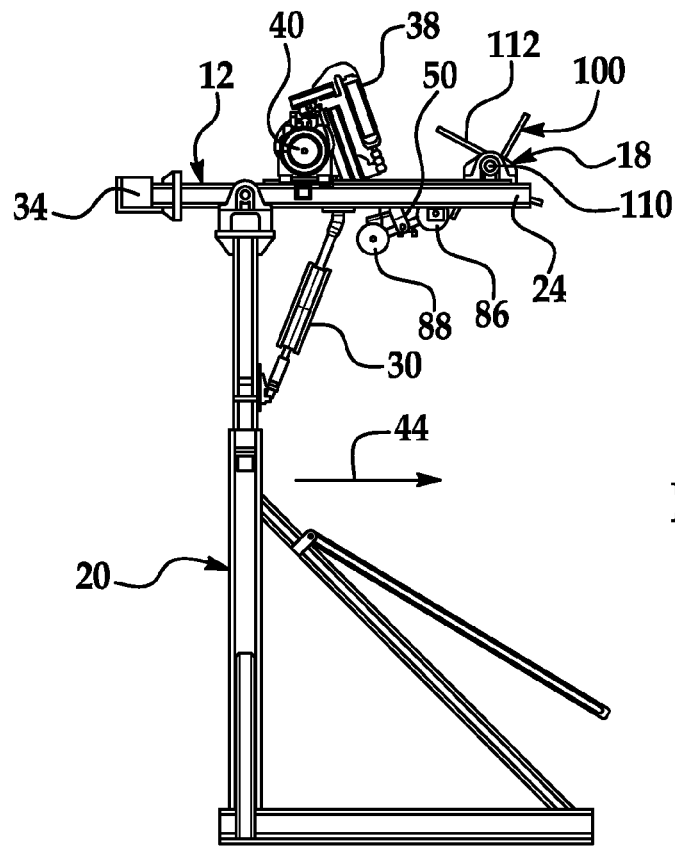
FIG. 2 is a side view of the apparatus for removing foreign material from an upwardly oriented surface of a body-in-white according to an embodiment as disclosed herein.
Figure 3:
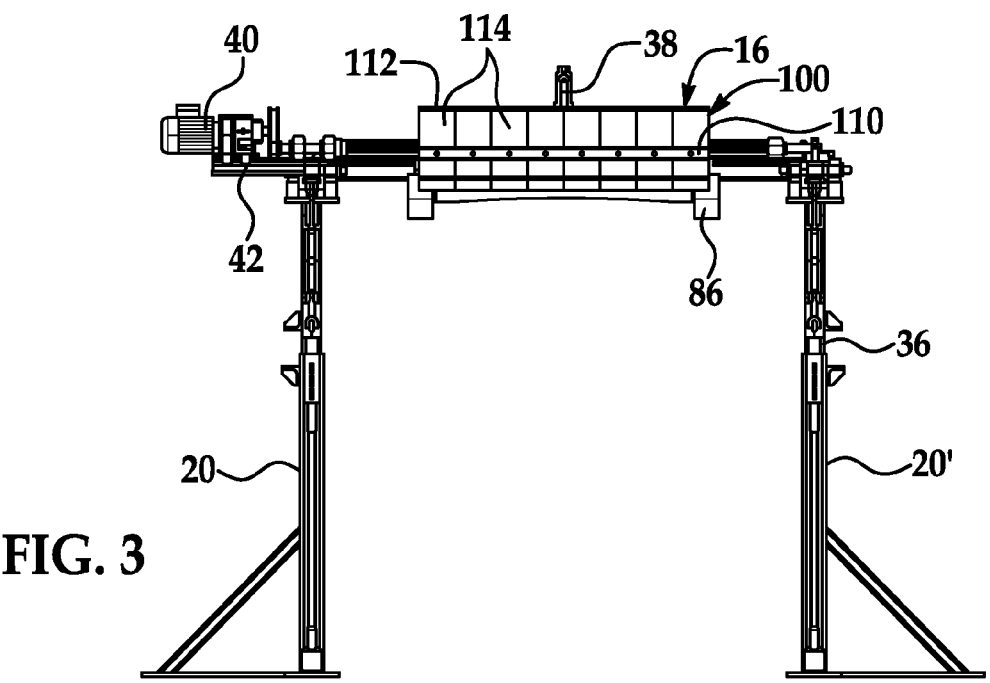
FIG. 3 is a rear view of the apparatus for removing foreign material from an upwardly oriented surface of a body-in-white according to an embodiment as disclosed herein.

The boom frame 12 can also include means for operating brush member 16 during operation of the apparatus 10. In the embodiment depicted, brush operational means can include a suitable brush operational motor 40. The motor 40 can be attached to the boom frame 12 at any suitable location. In the embodiment illustrated in FIGS. 2, 3 and 4, the brush operational motor 40 is mounted proximate to the pivot junction between upright 20 and the side arm 24 by means of a mounting device such as mounting shelf 42 projecting in cantilevered relationship outward from the upright 20.

The vacuum brush assembly 18 is oriented relative to the apparatus 10 such that the vacuum member 14 is positioned in front of the brush member 16 relative to the line of travel of the body-in-white 15 through the apparatus 10. In the embodiment disclosed herein, the body-in-white 15 travels through the apparatus in the direction of arrow 44. Vacuum member 14 is positioned in the boom frame 12 interior to the brush member 16 such that the vacuum member operates on the upwardly oriented surface of the associated body-in-white 15 prior to brush contact.

Vacuum member 14 includes vacuum head 50 defining a vacuum opening 52 that is oriented in spaced direct relationship relative to and above the upwardly oriented surface of the body-in-white 15. Vacuum head 50 is connected to a suitable source of vacuum pressure by one or more vacuum hoses 54. The vacuum pressure source can be incorporated into the apparatus 10 or can be located external to the apparatus as desired or required.

The vacuum head 50 can have any suitable dimensions. In various embodiments, the vacuum head 50 will have a length that generally comprehends the cross-sectional width of the upwardly oriented surface of the body-in-white 15. It is within the purview of this disclosure that the apparatus 10 can be employed to remove foreign material from the associated surface of bodies-in-white of various configurations. Thus the apparatus 10 can include means for adapting the apparatus to the specific contours and dimensions of the specific body-in-white 15. The adaptation means may include various moveable louvers and flaps to alter the length of the vacuum opening 52 to more specifically correspond to the dimensions of the surface to be cleaned.

In the embodiment depicted, the vacuum head 50 can include side members 56, 56' with leading longitudinal members 58 and trailing longitudinal member 60 as viewed in relation to the direction of forward travel of the body-in-white 15. The leading longitudinal member 58 and trailing longitudinal member 60 are connected to the side members 56, 56' and mounted therebetween to define a vacuum conduit contiguous to the vacuum opening 52. The vacuum housing 50 can also include a plurality of internal fins or baffles (not shown) interposed between the leading longitudinal member 58 and the trailing longitudinal member 60 to deflect and direct vacuum pressure delivered from the external vacuum source and to route removed material back to a suitable collection receptacle (not shown).

The vacuum head 50 can also include mounting member 64 configured to engage and connect to boom frame 12 by suitable attachment mechanism(s) not shown. Mounting member 64 can be contiguously connected to leading longitudinal member 58 and can project outward from the vacuum housing at a suitable angular orientation. In the embodiment depicted, the mounting member 64 is oriented perpendicular to the trailing longitudinal member 60.

The leading longitudinal member 58 can be configured with edge 66 configured and oriented proximate to the upwardly oriented surface of the body-in-white 15 when the apparatus 10 is in the use position. Edge 66 can be contoured to correspond to the contours of the upwardly oriented surface of the body-in-white 15. The corresponding edge of the trailing longitudinal member 60 can also have a similarly contoured edge if desired or required.

The boom frame 12 can also include roller members 68 configured to contact the body-in-white 15 at a landing location 70 proximate and exterior to the upwardly oriented surface to be cleaned. In the embodiment disclosed herein, roller members 68 are mounted on or in overlying relationship to exterior surfaces of the side members 56, 56' such that edge 66 of leading longitudinal member 58, and the corresponding edges of the trailing longitudinal member 60 and the side members 56, 56' are positioned and maintained at a spaced distance from the upwardly oriented surface of the body-in-white 15.

The roller members 68 can have a configuration suitable to maintain the associated vacuum member 14 in suspended orientation above the surface to be cleaned and the permit consistent progress the body-in-white 15 relative to the apparatus 10. The roller members 68 can be configured to flexibly contact the associated landing location 70 in a manner that minimizes or prevents abrasive contact with the surface of the body-in-white 15.

Figure 5:
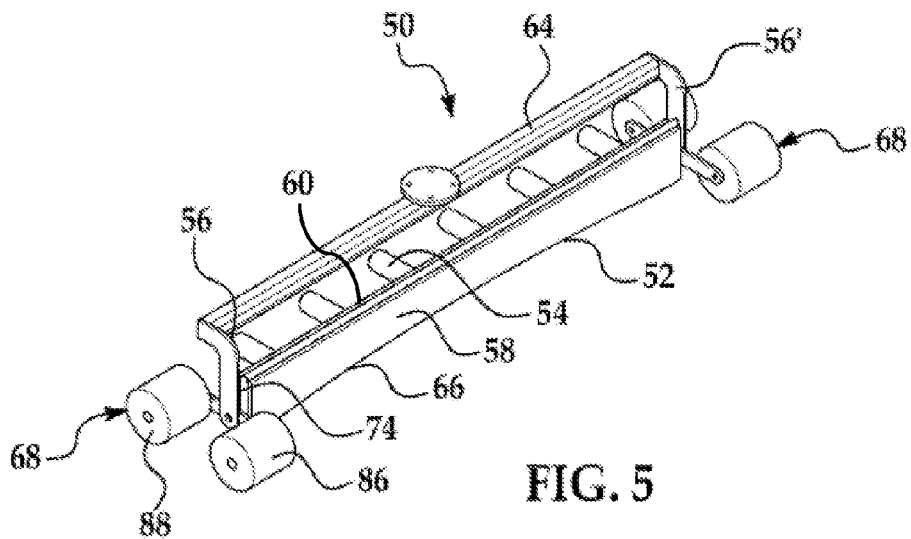
FIG. 5 is a detail view of an embodiment of the vacuum head according to an embodiment as disclosed herein.
Figure 6:
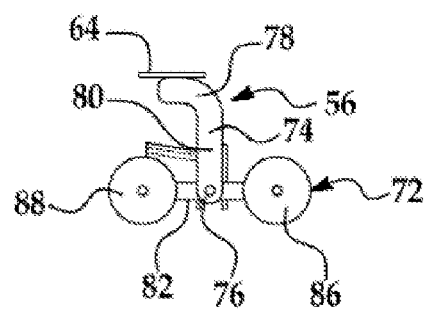
FIG. 6 is a detail view of wheel members according to an embodiment as disclosed herein.
Figure 7:
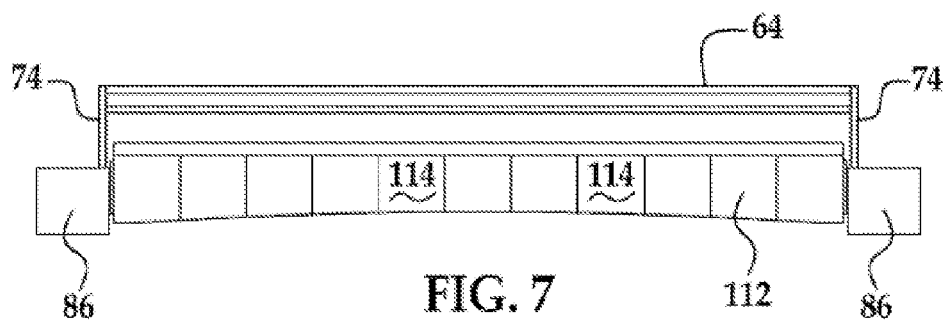
FIG. 7 is a rear view of an embodiment of a brush member flap as disclosed herein.

One non-limiting example of suitable roller members 68 is illustrated in the FIGS. 5 and 6. Roller members 68 are configured to follow the profile of the associated upwardly oriented surface of the body-in-white 15 such as the profile of roof 92 to provide a consistent distance between the vacuum head 50 and the roof 92.

Roller members 68 can each include at least wheel assembly 72 operatively mounted to the distal or lower end 76 of arm 74. Arms 74 are connected to the vacuum housing 50 in any suitable manner at a location generally proximate to proximate to upper end 78. It is contemplated that the arms 74 can be connected to respective side members 56, 56' in any suitable fashion or can even be integrated into the structure side members 56, 56' in certain embodiments (not shown). In the embodiment depicted in the drawing figures, the arm 74 has a perpendicularly oriented upper region 80 that is connected to mounting member 64 located proximate to the trailing longitudinal member 60.

Wheel assembly 72 can include at least one wheel operatively mounted to the associated arm 74. Where desired, the wheel or wheels of the wheel assembly 74 can project outward from the arm 74 in a direction opposed to and away from the vacuum housing 50. The wheel assembly 72 is composed a cross member 82 that can be pivotally connected to the lower end 76 of arm 74. Wheels 86 and 88 are positioned on opposed ends of cross member 82. The wheels 86, 88 can be composed of a suitable flexible resilient material such as polyurethanes and the like if desired or required. Without being bound to any theory, it is believed that the flexible resilient material employed in the wheels 86, 88 can provide increased traction between the respective wheel and the surface of the body-in-white 15. Additionally, it is believed that the configuration of the wheels can minimize or prevent surface scratches and the like imparted during the associated cleaning process. The respective wheel assemblies 72 can move independently of one another as the body-in-white 15 progress through the assembly 10.

The wheels 86, 88 will be of sufficient width to engage the body-in-white 15 at a location outside the boundary defined by the distance between side and upwardly oriented surface(s) of the body-in-white. In the embodiment depicted in FIG. 1, this is defined by the junction between roof 92 and side member(s) 90 located at roof ditch 94. In certain embodiments, it is contemplated that the width of the wheels 86, 88 is 4 inches. In various embodiments, the wheels 86, 88 can be single members or can be composed of multiple individual wheels positioned in tandem.

The apparatus 10 also includes a brush member 16 that is located proximate to and downstream of the vacuum member 14. In the embodiment illustrated, the brush member 16 is a rotating flap brush 100 that is operatively mounted on the boom frame 12. The flap brush 100 includes a central shaft 110 with a plurality of individual flaps 112 projecting axially outward therefrom. The central shaft 110 and associated individual flaps 112 are oriented at a relationship perpendicular to the direction of forward travel of the body-in-white 15 as it transits through the apparatus 10. The central shaft 110 and the individual flaps 112 are rotatably driven by a suitable motor such as motor 40. The flap brush 100 and associated motor 40 can be regulated and controlled by suitable variable frequency drive means configured to control the rotational speed based on factors including, but not limited to, the nature and concentration of the foreign material present on the surface to be cleaned and the speed at which the body-in-white 15 transits the apparatus 10.

The individual flaps 112 can be composed of any suitable material such as industrial felt padding sheets and the like. Here desired or required, the individual flaps 112 can be composed on individual strips 114 placed in side-by-side abutting relationship. The individual flaps 112 can have suitable dimensions that permit brushing contact with the upwardly oriented surface of the body-in-white 15. The width of the flaps 112 as measured from body surface to central shaft 110 can be governed by the radius of the wheels 86, 88 such that the width of the flaps 112 is greater than the wheel radius and can have any value up to and including twice the wheel radius. In the embodiment depicted, it is contemplated that the individual flaps 112 will have a width as measured from central shaft 110 to outer edge of approximately four inches.

In the apparatus 10 as disclosed herein, the vacuum member 14 mounted on boom frame 12 exerts sufficient vacuum force sufficient to dislodge and remove debris adhering to the upwardly oriented surface as the body-in-white 15 passes through the apparatus 10. The brush member 16 is positioned immediately downstream of the vacuum member 14 such that the rotating flaps 112 continually contact the newly vacuumed surface to collect and remove residual oil and debris that is not dislodged during the vacuum operations. Once the surface has passed through the vacuum and brush operations, the resulting surface exhibits a level of cleanliness sufficient to permit coating operations such as e-coating and the like.

In the method as disclosed herein, the body-in-white 15 is conveyed into registration with the apparatus 10. At the initiation of cleaning operations, the boom frame 12 is at rest in a supported position as by various pneumatic supports and the like. The vacuum member 14 and brush member 16 can be either in operation or at rest at the initiation of the cleaning process depending upon variables including, but not limited to, line speed and the like. If the apparatus 10 is in the "off" position when the conveyor assembly line is stopped, it is contemplated that the vacuum member 14 and the brush member 16 can be activated by any suitable triggering mechanism.

The boom frame 12 is oriented such that the roller members 68 engage the leading edge of the upwardly oriented surface of the body-in-white 15 such as roof 92. Once the roller members 68 engage the leading edge of roof 92, the boom frame 12 will rise and fall based on the associated roof line contour. Roller members 68 project downward below the boom frame 12 and the associated vacuum member 14 and orient the vacuum member 14 to a defined and consistent spaced distance from the surface to be cleaned. The vacuum member 14 rises and falls relative to roof contour based upon the action of the roller members 68.

The brush member 16 is located on the boom frame 12 proximate and immediately downstream of the vacuum member 14. In the embodiment depicted, the brush member 16 is located at a position immediately outside the zone of vacuum generated by the vacuum member 14. Brush member 16 includes rotation flap members that contact the newly vacuumed surface in a manner that removes residual oil debris remaining on the associated surface. As the body-in-white 15 passes beyond the boom frame 12, the boom frame 12 returns to the initial position. Operation of the vacuum member 14 and the brush member 16 can be discontinued between cleaning cycles or by any suitable trigger as desired or required. The initial position can be supported and maintained by various devices such as jack screws, actuators or the like that can project between the boom frame 12 and uprights 20, 20'. Operation of vacuum member 14 and brush member 16 can be triggered and/or discontinued by various mechanisms and means as desired or required. Non-limiting examples of means for triggering and/or discontinuing operation can be accomplished utilizing devices such as position sensors that locate the relative position of one or more of the vehicle position, boom frame position or the like.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. An apparatus for removing foreign material from an upwardly oriented surface of a body-in-white moving down an assembly line in a direction of forward travel, the apparatus comprising:
   a boom frame pivotally supported on upright support members in spaced relation to one another, the boom frame having a use position;
   a vacuum member mounted on the boom frame and suspended in overlying relationship above the upwardly oriented surface of the body-in-white, as the body-in-white moves down the assembly line, the vacuum member generating a vacuum force on a localized region of the upwardly oriented surface, the vacuum member defining a vacuum opening in a direct spaced overlying relationship with respect to the localized region of the upwardly oriented surface, and configured to remove debris directly from the localized region when the boom frame is in the use position;
   a brush member mounted on the boom frame at a location spaced away from the vacuum member and downstream of the vacuum member relative to a line of travel of the body-in-white, the brush member contacting the upwardly oriented surface of the body-in-white at a location immediately downstream positioned and beyond the localized region exerted by the vacuum member; and
   at least one pair of roller members connected to the vacuum member and extending downward therefrom at an orientation configured to movably and directly contact the body-in-white at a location proximate to the upwardly oriented surface for maintaining a consistent spaced distance between the upwardly oriented surface and the respective vacuum member and brush member.

2. The apparatus of claim 1 wherein the brush member comprises:
   a central shaft having a circumference, the central shaft mounted to the boom frame and oriented at an angle relative to the direction of forward travel;
   a plurality of flexible brush members extending axially outward from the central shaft, the flexible brush members configured to contact the upwardly oriented surface; and
   a motor mounted on the boom frame for imparting axial rotation to the central shaft.

3. The apparatus of claim 2 wherein the brush members are flexible elongated felt flap members extending in axial spaced relationship around the circumference of the central shaft.

4. The apparatus of claim 1 wherein the roller members each comprise:
   a mounting arm connected to the boom frame and projecting downward therefrom to a distal end;
   at least one lateral arm pivotally mounted to the distal end of the mounting arm at a central location defined therein and defining two opposed ends; and
   wheels operatively mounted to the two opposed ends of the lateral arm, the wheels configured to axially contact the upwardly oriented surface of the body-in-white, the lateral arm pivoting relative to contours of the upwardly oriented surface.

5. The apparatus of claim 4 wherein the mounting arm is connected to the vacuum member and the vacuum member is connected to the boom frame.

6. The apparatus of claim 1 wherein the boom frame comprises two side arms and at least two elongated lateral members.

7. The apparatus of claim 6 wherein the brush member defines one of the at least two elongated lateral members.

8. The apparatus of claim 6 further comprising a counterweight attached to both side arms.

9. An apparatus for removing foreign material from an upwardly oriented surface of a body-in-white moving down an assembly line in a direction of forward travel, the apparatus comprising:
   a boom frame pivotally supported on upright support members in spaced relation to one another by a pivotal support member, the boom frame having a use position;
   a vacuum member mounted on the boom frame and suspended in overlying relationship above the upwardly oriented surface of the body-in-white, the vacuum member generating a vacuum force on a localized region of the upwardly oriented surface, the vacuum member including:
      a vacuum head connected to the boom frame, the vacuum head having a vacuum opening oriented in direct spaced overlying relation to the upwardly oriented surface of the body-in-white, and configured to remove debris directly from the upwardly oriented surface when the boom frame is in the use position; and
      at least one vacuum hose operatively connecting the vacuum head and a suitable vacuum-generating means;
   a brush member mounted on the boom frame at a location spaced away from the vacuum member and positioned downstream of the vacuum member in a line of travel of the body-in-white, the brush member contacting the upwardly oriented surface of the body-in-white at a location immediately downstream and beyond the localized region exerted by the vacuum member; and at least one pair of roller members connected to the vacuum member and extending downward therefrom at an orientation configured to movably contact the body-in-white at a location proximate to the upwardly oriented surface for maintaining a consistent spaced distance between the upwardly oriented surface to be cleaned and the respective vacuum member and brush member.

10. The apparatus of claim 9 wherein the brush member comprises:

a central shaft having a circumference, the central shaft mounted to the boom frame and oriented at an angle relative to the direction of forward travel;

a plurality of flexible brush members extending axially outward form the central shaft, the flexible brush members configured to contact the upwardly oriented surface; and a motor mounted on the boom frame for imparting axial rotation to the central shaft.

11. The apparatus of claim 10 wherein the brush members are flexible elongated felt flap members extending in axial spaced relationship around the circumference of the central shaft.

12. The apparatus of claim 9 wherein the roller members each comprise:

a mounting arm connected to the vacuum head and projecting downward therefrom to a distal end;

at least one lateral arm pivotally mounted to the distal end of the mounting arm at a central location defined therein and defining two opposed end; and wheels operatively mounted to the two opposed ends of the lateral arm, the wheels configured to axially contact the upwardly oriented surface of the body-in-white, the lateral arm pivoting relative to contours of the upwardly oriented surface.

13. A process for removing foreign material from an upwardly oriented surface of a body-in-white moving down an assembly line, the process comprising the steps of:

orienting the body-in-white on an assembly line in a direction of forward travel;

advancing the body-in-white into contact with an apparatus comprising:

a boom frame pivotally supported on upright support members in spaced relation to one another, the boom frame having a use position;

a vacuum member mounted on the boom frame and suspended in overlying relationship above the upwardly oriented surface of the body-in-white as the body-in-white moves down the assembly line in a direction of forward travel, wherein the vacuum member defines a vacuum opening in a direct spaced overlying relationship with respect to the upwardly oriented surface, and generates a vacuum force on a localized region of the upwardly oriented surface;

a brush member mounted on the boom frame at a location spaced away from the vacuum member and positioned downstream of the vacuum member relative to a line of travel of the body-in-white, the brush member contacting the upwardly oriented surface of the body-in-white at a location immediately downstream and beyond a localized region exerted by the vacuum member; and at least one pair of roller members connected to the vacuum member and extending downward therefrom at an orientation configured to movably and directly contact the body-in-white at a location proximate to the upwardly oriented surface for maintaining a consistent spaced distance between the upwardly oriented surface and the respective vacuum member and brush member;

allowing the upwardly oriented surface of the body-in-white to remain in contact with the apparatus for an interval sufficient to remove at least a portion of foreign material present on the upwardly oriented surface.

14. The process of claim 13 wherein the brush member is mounted on the boom frame and further comprises:

a central shaft having a circumference, the central shaft mounted to the boom frame and oriented at an angle relative to the direction of forward travel;

a plurality of flexible brush members extending axially outward from the central shaft, the flexible brush members configured to contact the upwardly oriented surface; and a motor mounted on the boom frame for imparting axial rotation to the central shaft; and wherein the vacuum member is mounted on the boom frame and further comprises:

a vacuum head connected to the boom frame, the vacuum head having a vacuum opening oriented in direct spaced overlying relation to the upwardly oriented surface of the body-in-white when the boom frame is in the use position;

at least one vacuum hose operatively connecting the vacuum head and a suitable vacuum-generating means.

* * * * *